US009923226B2

(12) United States Patent
Fuglevand

(10) Patent No.: US 9,923,226 B2
(45) Date of Patent: Mar. 20, 2018

(54) MEMBRANE ELECTRODE ASSEMBLIES AND ASSOCIATED FUEL CELLS

(71) Applicant: Emergent Power Inc., Latham, NY (US)

(72) Inventor: William A. Fuglevand, Spokane, WA (US)

(73) Assignee: Emergent Power, Inc., Latham, NY (US)

( * ) Notice: Subject to any disclaimer, the term of this patent is extended or adjusted under 35 U.S.C. 154(b) by 389 days.

(21) Appl. No.: 14/468,228

(22) Filed: Aug. 25, 2014

(65) Prior Publication Data
US 2015/0056534 A1 Feb. 26, 2015

Related U.S. Application Data

(60) Provisional application No. 61/870,151, filed on Aug. 26, 2013.

(51) Int. Cl.
H01M 8/241 (2016.01)
H01M 8/1004 (2016.01)
H01M 4/04 (2006.01)
H01M 8/1097 (2016.01)
H01M 8/00 (2016.01)
H01M 8/1018 (2016.01)
H01M 8/1069 (2016.01)
H01M 8/0247 (2016.01)

(52) U.S. Cl.
CPC ......... *H01M 8/241* (2013.01); *H01M 4/0407* (2013.01); *H01M 8/1004* (2013.01); *H01M 8/1097* (2013.01); *H01M 8/006* (2013.01); *H01M 8/0247* (2013.01); *H01M 8/1076* (2013.01); *H01M 2008/1095* (2013.01); *Y02P 70/56* (2015.11)

(58) Field of Classification Search
None
See application file for complete search history.

(56) References Cited

U.S. PATENT DOCUMENTS

2010/0196787 A1* 8/2010 Inoue ................. H01M 8/04119 429/483

FOREIGN PATENT DOCUMENTS

WO 2012117035 A1 9/2012

* cited by examiner

Primary Examiner — Sarah A. Slifka
(74) Attorney, Agent, or Firm — Paul W. Mitchell; Rainier Patents, P.S.

(57) ABSTRACT

The description relates to fuel cells and fuel cell systems. One example includes at least one multi cell membrane electrode assembly (MCMEA). Individual MCMEAs can include multiple serially interconnected sub-cells.

15 Claims, 8 Drawing Sheets

MEMBRANE ELECTRODE ASSEMBLIES AND ASSOCIATED FUEL CELLS

BRIEF DESCRIPTION OF THE DRAWINGS

The accompanying drawings illustrate implementations of the concepts conveyed in the present patent. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the figure and associated discussion where the reference number is first introduced.

DETAILED DESCRIPTION

Overview

This patent relates to fuel cells and fuel cell systems that include fuel cells. Individual fuel cells can include membrane electrode assemblies (MEAs). The present concepts can relate to dividing an individual MEA into subunits. The subunits of an individual cell can be arranged in a serial manner. For a given power produced by the individual cell, this arrangement can increase voltage and decrease current.

One implementation of these concepts involves a plurality of identically sized and/or shaped electrode pairs configured on a composite polymer membrane substrate to form a planar integrated multi-cell MEA (hereinafter, multi-cell MEA or MCMEA). In one configuration, anode electrodes are common to one side of the MCMEA (e.g., sheet assembly) and cathode electrodes are common to the opposite side. Adjacent opposing electrodes are electrically cross connected in series (anode to adjacent cathode, etc.) In this configuration, the MCMEA is gas impervious, is designed for anode side sealed operation within a single gas frame, and provides a comparatively high voltage, low current output as compared to prior art similarly sized single cell MEAs.

Example Implementations

Figure 1:
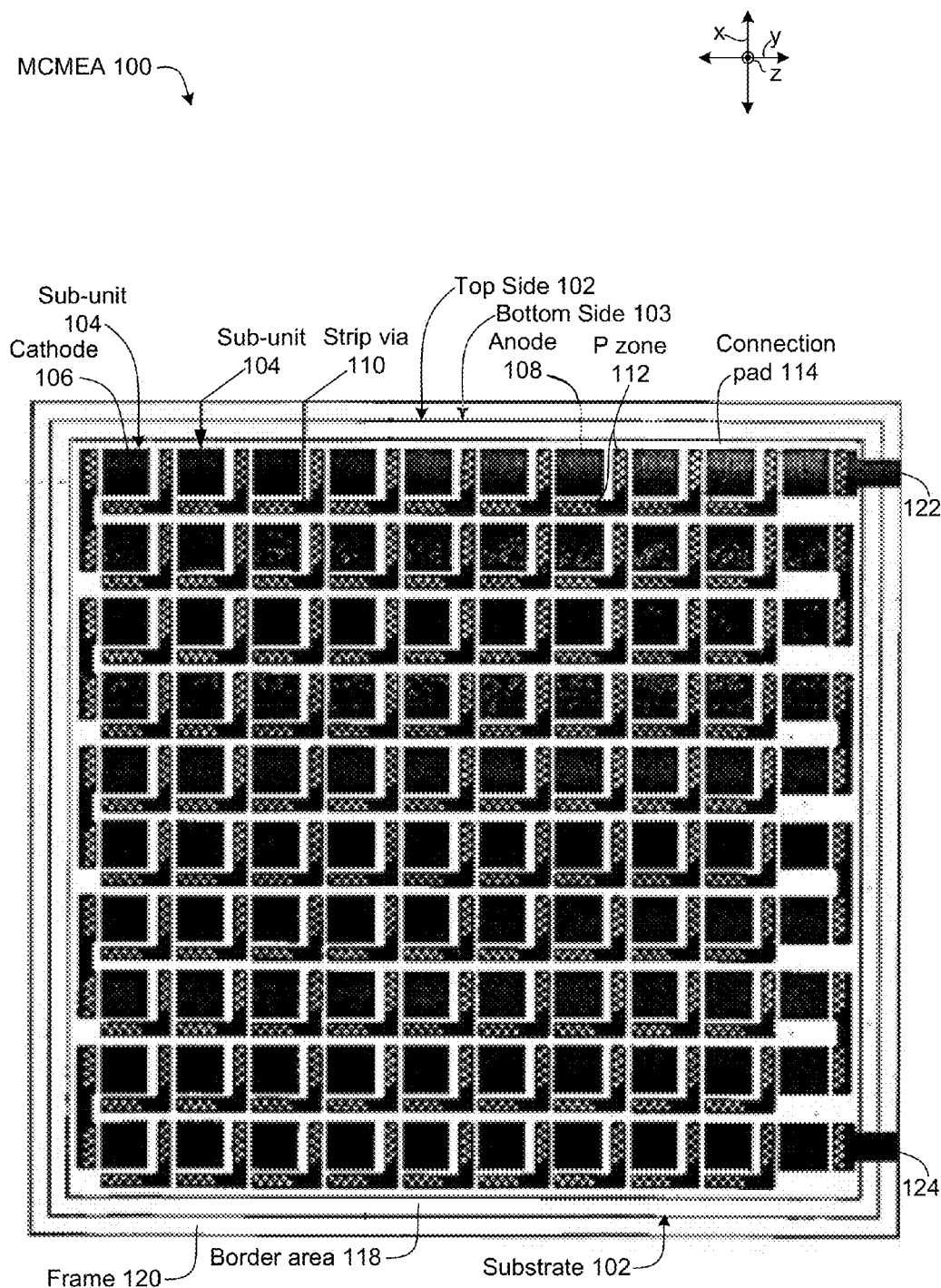
FIGS. 1-6 show elevational views of MCMEA examples in accordance with some implementations.
Figure 2:
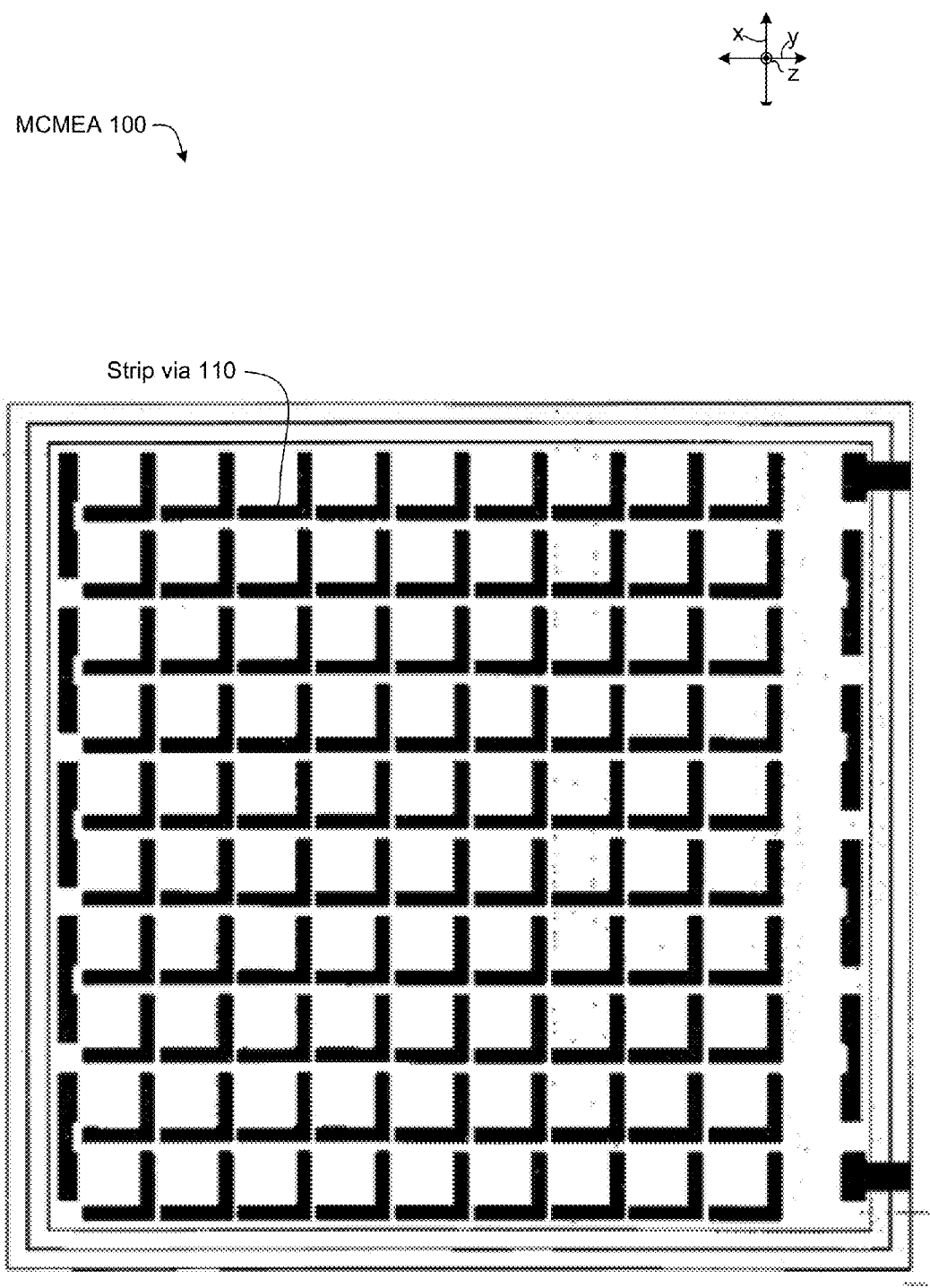

FIGS. 1-5 collectively show one implementation of an MCMEA 100. (Note that FIGS. 1-5 are elevational views of one implementation. FIG. 6 shows an elevation view of another implementation, and FIGS. 7-10 show sectional views of the implementation of FIG. 6. The concepts may be more readily understood and visualized by considering FIGS. 1-5 and 6-10 collectively). The example MCMEA 100 of FIG. 1 is manifest on a composite polymer membrane substrate 102. A top side (e.g., facing toward the reader) of the MCMEA is shown in FIGS. 1-5. An opposite bottom side or surface is facing away from the reader. These surfaces are designated relative to FIGS. 6-9.

Multiple sub-cells or sub-units 104 are formed on the composite polymer sheet substrate 102. Stated another way, the MCMEA is divided into 100 MEA sub-cells 104 (e.g., 10 rows of 10). (Note that many of the elements of FIG. 1 have multiple occurrences, not all of which are designated with specificity.) Of course, while 100 sub-cells are illustrated, other implementations can use other numbers of sub-cells. In this implementation, each of the sub-cells has an equivalent size and shape active area, though such need not be the case.

The MCMEA can further include common cathodes (e.g., cathode electrode) 106 on the top (outward facing) surface, common anodes (e.g., anode electrode) 108 on the bottom surface, embedded strip vias 110 with perforation zones 112 for interconnection (half on top and half on bottom), conductive ink overprint areas (e.g., connection pads) 114 to connect each via 110 to its adjacent electrode, and the peripheral border area 118 for establishing a "gas tight" seal to a frame enclosure (e.g., frame) 120. (Note that as illustrated the cathodes are on the front of the MCMEA 100 (e.g., facing toward the reader of FIG. 1) and the anodes 108 are on the back (e.g., facing away from the reader). As such, the designator lines of the anodes are shown in ghost as they pass behind the MCMEA. Anodes are readily visualized in the cross-sectional views of FIGS. 7-10.

Each of the 100 sub-cells 104 within the MCMEA 100 can be referred to as an individual sub-MEA. These sub-MEAs are all interconnected electrically to form a contiguous multi-cell series electrical circuit on the single composite polymer substrate 102. The multi-cell series electrical circuit can have a positive output terminal 122 and a negative output terminal 124 (Note: In one configuration, a 100 cell MCMEA operating at maximum power conditions will tend to present approximately 65 volts DC at its output. Its open circuit voltage will tend to be greater than 95 volts DC.) Individual MCMEA can be electrically connected together in parallel by connecting their positive output terminals together and their negative output terminals together.

In this configuration, anodes 108 are common to one side of the MCMEA 100 and cathodes 106 are common to the opposite side. Adjacent opposing electrodes are electrically cross connected (e.g. interconnected) in series (anode to adjacent cathode, etc.). In this configuration, the MCMEA is gas impervious and is designed for anode side sealed operation within gas frame 120. The MCMEA provides a comparatively high voltage, low current output as compared to prior art similarly sized single cell MEAs.

One process for constructing the MCMEA 100 is described below. At step 1, one sheet of sulfonyl can be hot melt extruded from either the R-1000 or R-1100 Nafion® thermoplastic resins and optionally co-formed with a PTFE micro mesh material to produce a sheet of composite polymer with a thickness of 8 to 12 microns. The PTFE mesh, if incorporated, can add mechanical strength to the membrane, a useful property for long run time operation.

Next, a second sheet of sulfonyl can be hot melt extruded from the same Nafion® thermoplastic resin as above and with a similar thickness. (Note that the first and second sheets can be more readily visualized in the sectional views of FIGS. 5-9). The conductive vias 110 (shown on FIG. 2) can be printed, formed, or otherwise transferred onto the juxtaposed (e.g., adjacent or inwardly facing) side of this sheet in "mesh" patterns in order to enhance the fusion process in the next process step. Stated another way, the vias 110 are sandwiched between the first and second sheets. The vias 110 can be embedded during process step three (described below). Note that specific metal particles (i.e. silver, copper, etc.) can be added to the carbon inks (as available from Henkel, Vorbeck, and others) used for the embedded vias to provide highly conductive pathways which nearly eliminate losses. Embedded metal particles, if incorporated, will generally not be subject to corrosion since the sulfonyl regions surrounding embedded "vias" will not transport water molecules.

An alternative to the printed ink via 110 approach is to construct decals of properly positioned conductive open pattern stamped thin metal "via" elements which can be precisely transferred to the second sulfonyl sheet. The patterned openings may provide a better sheet fusion result during the next process, and can realize the (potentially) optimum desired conductivity. Metallic ends exposed during the perforation process in step 1010 below, can be pretreated with a corrosion resistant thin carbon coating formulation.

A second alternative is to employ highly conductive carbon fiber yarn or thin woven patterned sheets (as available from Zoltek) combined with conductive carbon inks mentioned previously to form the vias 110.

Third, the two sheets from steps 1 & 2 (being both sulfonyl thermoplastics) can be surface fused together (sonically or thermally) to form a final composite polymer sheet with vias 110 now embedded. This sheet can be strictly homogeneous in the "window" regions which will be subsequently formed into sub-cells. This composite sheet can form the backbone for the entire MCMEA 100.

Figure 3:
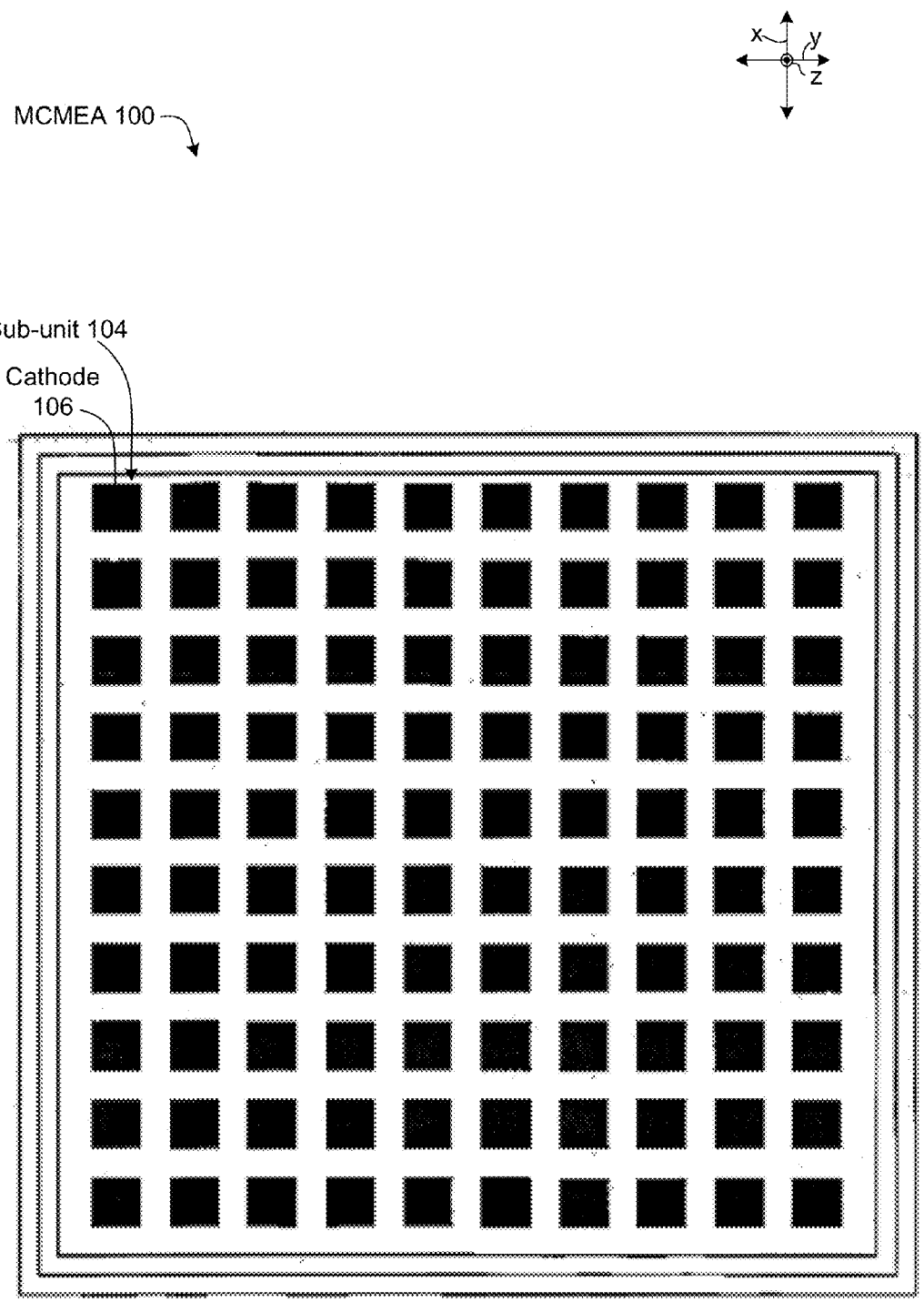

Fourth, porous electrodes (e.g., cathodes 106 and anodes 108) for the sub-cells 104 are printed onto the top and bottom sides of the backbone composite sheet (produced in step three above) in uniform geometries such as shown on FIG. 3. Methods to formulate electrode inks, deposit, and bond them onto membrane surfaces are known. In one case, supported catalyst (platinum on carbon) particles are combined (e.g., mixed) with additional carbon (i.e. XC72 Vulcan), a suspension medium (comprising a hydrocarbon with an ether, epoxy, or ketone linkage) and a polymer binder (sulfonyl fluoride or sulfonic acid polymer in dispersion solution). This mixture can be sonicated and printed, coated, or otherwise bonded onto the surface of the membrane. In some implementations, total platinum loading can be around 0.5 $mg/cm^2$, and may differ on anodes vs. cathodes. For example, platinum loading on the anode can be 0.2 $mg/cm^2$ and the cathode can be 0.3 $mg/cm^2$, among other configurations. A heat pressing step may be used to bond the electrodes to the substrate membrane. Finished sub-cell active electrodes are porous and contain binders consisting of polymer compatible to the backbone substrate. In summary, FIG. 3 shows the post fusion backbone sheet showing electrode features formed uniformly on the top and bottom sides (step 4). Sulfonyl membrane under each electrode will ultimately be converted chemically to the $SO_3H$ acid form (step 7).

Figure 4:
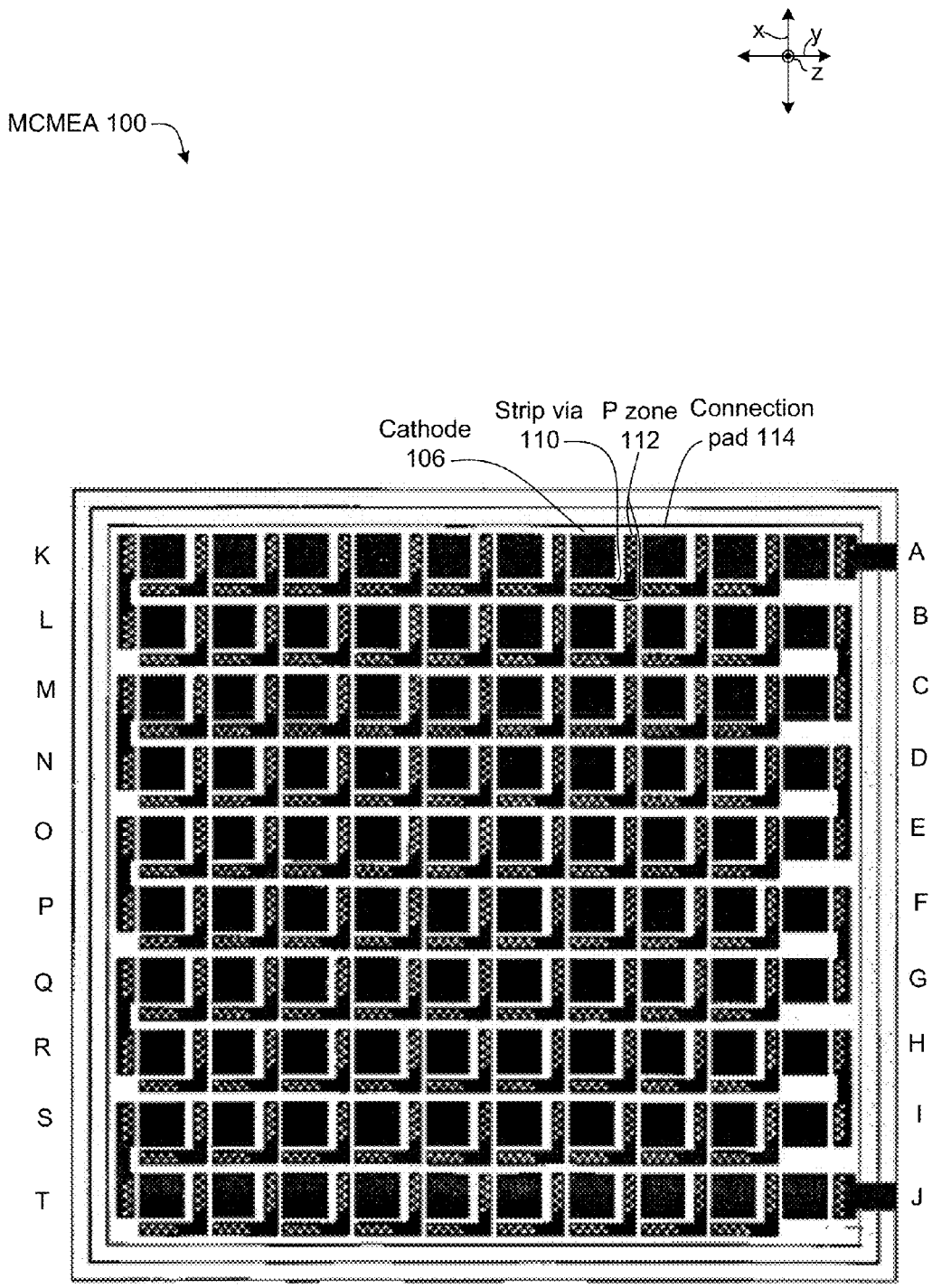

As shown on FIG. 4, opposite sides of the backbone sheet membrane can be perforated (by laser or other means) in the "dotted" areas (e.g., perforation zones 112) to expose the embedded vias 110 for surface electrical connection to the adjacent electrodes (e.g., cathodes 106 and anodes 108). These perforations extend only to the depth of the embedded via in accordance with a "blind" via structure which prevents complete penetration of the backbone membrane at a single point, thus maintaining the gas impervious feature of the substrate. Stated another way, dotted perforation points can be opened to expose the embedded via (half from the top side and half from the bottom side) and overprinted with conductive ink to connect the adjacent electrode, thus completing a contiguous series connection of all sub-cells.

Connection pad 114 (e.g., overprint area or region) extends from the perforation zone 112 to slightly overlap the adjacent electrode (e.g., cathode 106 or anode 108). The connection pad 114 can be printed with highly conductive carbon ink in order to electrically connect the embedded via to the adjacent electrode. As shown on FIG. 4, each embedded via has two perforation zones. One of these is processed on the top side of the backbone sheet, and the other is processed on the bottom. Since the polymer which covers the embedded via is in sulfonyl form (thermoplastic), a compatible dispersion can be combined with the conductive ink to "heal" and close the perforation following deposition of the conductive overprint link. In some cases, it can be imperative that the conductive link be realized with the proper geometry in order to greatly minimize resistance in the overprint region. Conductive carbon yarn or fabric (as available from Zoltek) may also be employed in the overprint region formation.

The sulfonyl polymer membrane between electrode pairs in each sub-cell can now be hydrolyzed (chemically treated) to change the "$SO_2F$" form into the "$SO_3H$" form, more commonly known as the acid form, or "proton" conducting form of Nafion®. This is often a preferred electrolyte for Proton Exchange Membrane (PEM) fuel cells.

DuPont's technical guide offers directions to hydrolyze the sulfonyl membrane. This is a two-step process which first converts the membrane into a potassium ion conducting membrane, and finally into a proton conducting membrane.

One approach is to convert the polymer with the electrodes already in place. The proper chemical treatment can be applied right through the porous electrode. As such, any sulfonyl dispersion binders used to prepare the electrode will also get converted in the process. If "$SO_3H$" acid dispersions were used to prepare the electrode, then only the sulfonyl membrane will be affected.

Membrane conversion with chemical treatment could have been completed following process step #3, however, it may be advantageous to complete the conversion at this point, since the composite membrane has been much easier to handle in full sulfonyl form.

All sub-cells 104 are carefully masked to allow access windows only to the electrode surfaces. In one implementation this will utilize a masking fixture which accepts the entire composite sheet assembly and forms a tight liquid seal around each electrode on both sides leaving only the electrodes open to the chemical treatment. Once the masking fixture is secured with the MCMEA, the chemical treatment can commence in two steps: first, hydrolysis, followed by acid conversion. Other implementations may use other masking techniques.

Hydrolysis Process

In one implementation, the electrode windows are hydrolyzed in a solution of 15% KOH/35% DMSO/50% de-ionized (DI) water at 80° C. for a time period of 30 minutes to an hour, depending on the thickness of the composite sheet. Afterwards, the windows are thoroughly washed with de-ionized water. This should be done several times, by soaking the windows in room temperature de-ionized water for at least 30 minutes, then renew the water and repeat at least two additional times to remove all traces of un-reacted KOH. The Nation® PFSA resin is now in the K+ form.

Acid Conversion Process

The hydrolyzed sheet windows can be converted to the H+ form by exchanging the K+ for H+ ions using a 10 to 15% solution of nitric acid ($HNO_3$). Since this is an "equilibrium" exchange, this step should be repeated at least twice with fresh Nitric Acid, including a fresh de-ionized water rinse after each acid treatment. Following this final treatment, membrane material within all windows, including any sulfonyl dispersion in electrode active coatings, will now be in the $SO_3H$ (or acid form) ready to conduct protons.

MCMEA fabrication can be completed with printing of "sense traces" and/or with internal cell shunting traces as defined by custom designs. The border area can be prepped for its sealing function, and electrical output tabs are exposed for electrical connection outside the seal boundary. Quality Control checks can be completed for the entire finished integrated MCMEA 100.

Module Assembly and Conditioning (Post MCMEA Manufacturing)

Figure 5:
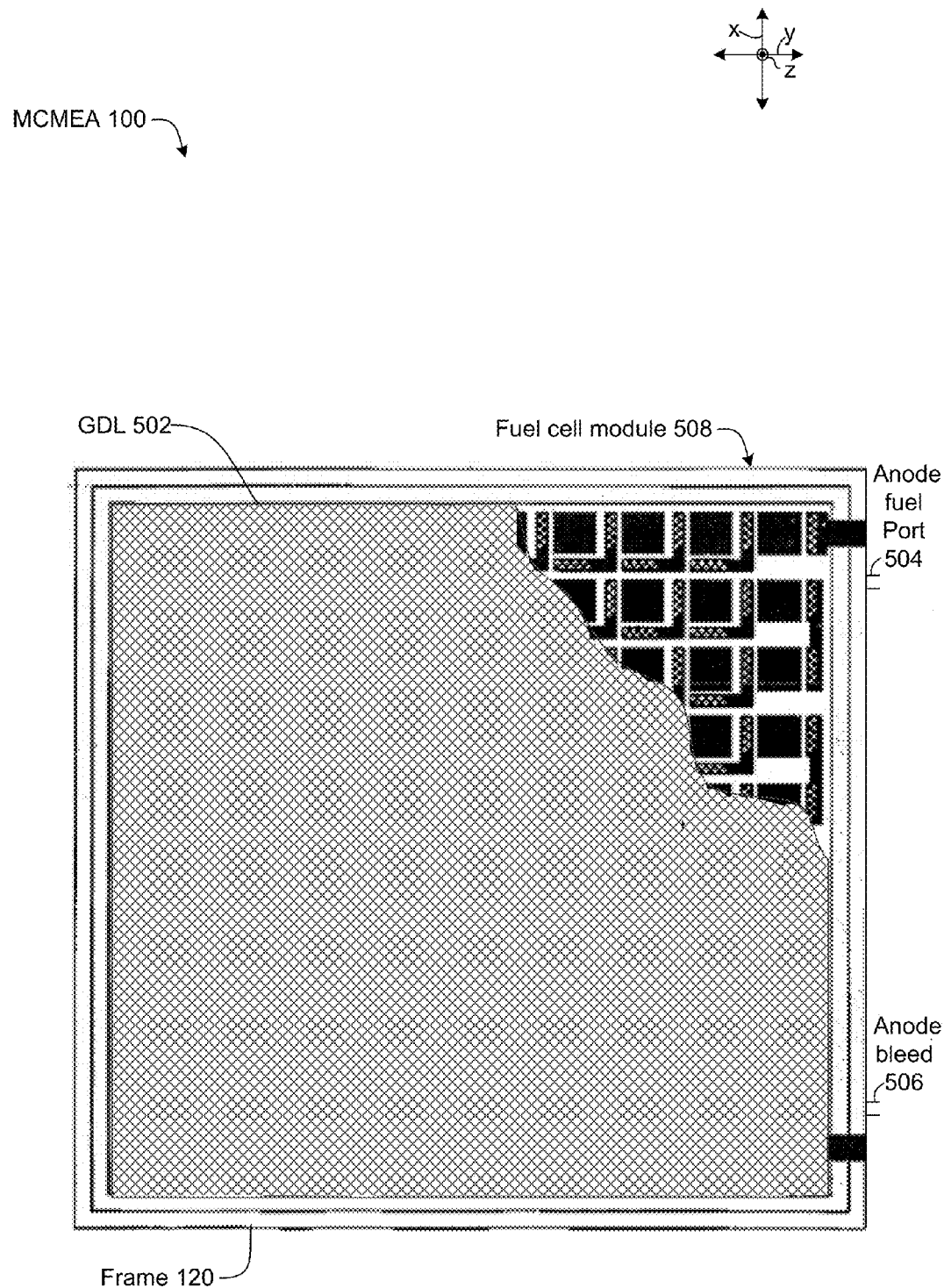
Figure 6:
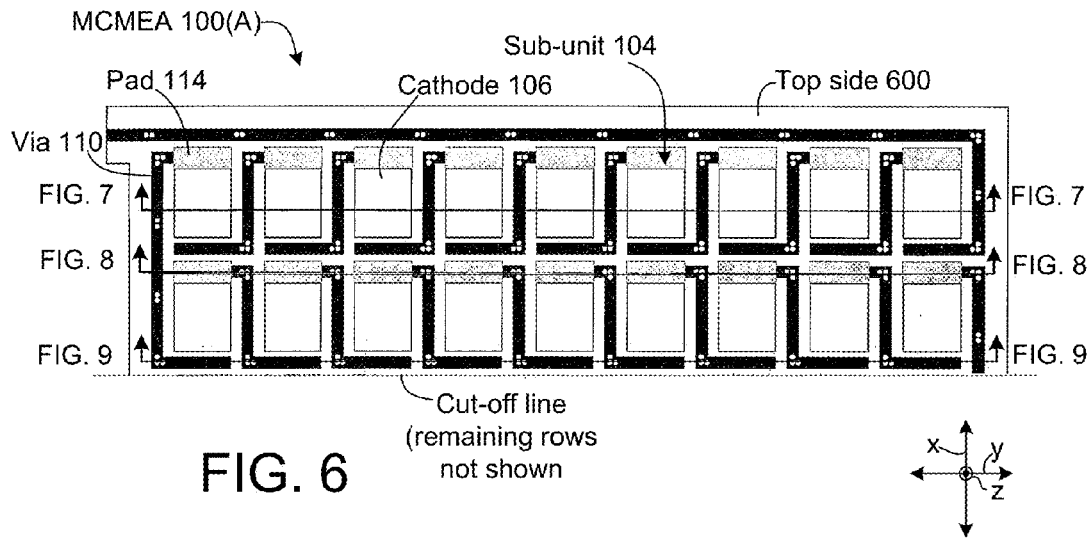

FIG. 5 shows the MCMEA 100 is now ready to be sealed within the frame 120 (sonic weld or bead seal), combined with gas diffusion plates (e.g., macro GDLs 502 (shown in a partial cutaway view)). Though not shown, the MCMEA 100 can also include a cathode heat sink. In this implementation, the cathode heat sink is thermally conductive and electrically insulative. FIG. 5 also shows an anode fuel port 504 on the frame 120 for supplying fuel to the MCMEA 100 and an anode bleed port 506 for removing inert fuel components. The entire assembly (e.g., the MCMEA 100, GDL 502, frame 120, fuel port 506, and/or fuel bleed port 508 can be thought of as a fuel cell module 508). The fuel cell module can be ready for operation within a "smart" conditioning fixture, which will verify MCMEA operation and bring all cells to the proper level of hydration (conditioning). Upon completion, fuel cell modules 508 can be installed in a fuel cell power system (an example of which is discussed relative to FIG. 11).

Note that the above description provides great detail about the structure of one implementation of the MCMEA and how to make the MCMEA starting with two polymer sheet substrates. An alternative fabrication technique can utilize 3-D printing and fused deposition of the polymer substrate material as well as the additional materials utilized to form the anodes, cathodes, vias, connection pads, active areas, insulative areas, etc.

Design Variations

The 100 sub-cell MCMEA 100 shown on FIGS. 1-5, is just one of numerous possible designs which can be employed to accomplish similar results. The number of sub-cells, all the geometries, the material makeup of electrodes and vias, membrane thickness, and the composite mesh layer, can all be varied according to design guidelines. In addition, each process step can be varied to suit best practices and specialized capabilities of particular manufacturers, who may also be called upon in specific cases to add value with their own proprietary procedures and materials.

This implementation of the MCMEA 100 is intended to be housed within a single gas frame 120 with two non-electrically conductive gas diffusion plates or layers (e.g., macro GDLs 502 (the cathode GDL is visible in FIG. 5, the anode GDL is not)) covering the entire cathode and anode sides (not shown) respectively. Electrical and gas connections can be completed on the edge of the frame which will be designed for sealed hydrogen (or other) feed and bleed on the anode side, and open fan forced air (oxidant) and cooling flow on the cathode side. The MCMEA construct is described in detail, with lesser emphasis placed on the frame, GDL (gas diffusion layer), and auxiliary components that can be utilized for an operational module.

The GDL is a component found on each side of each MEA in an existing fuel cell stack assembly. Traditionally, since this material is in the (cell/stack) electrical current pathway, it must be electrically conductive. It is also thermally conductive.

In some of the present implementations, the electrical pathways are internal to the MCMEA 100. Even though a macro GDL 502 is on each side of the MCMEA, (in the broader assembly) the macro GDL is not intended to be electrically conductive (e.g., is in contrast electrically insulative). This configuration can allow the porous macro GDL material to be selected from a broader range of lower cost alternatives. The macro GDL material can be functionalized for water management and thermal conductive properties. The MCMEA will supersede single cell MEAs known in the prior art.

In some implementations, each sub-cell 104, consists of two porous electrodes which sandwich an ion conducting (electrolyte) portion of the composite membrane between them. The membrane area outside each sub-MEA is not ion-conducting. Accordingly, the composite sheet membrane has alternating ion-conducting (electrolyte) regions and non-ion-conducting (non-electrolyte) regions. Thus, ions within a single sub-cell are confined only to that one sub-cell. Also, it is important to note that the membrane, in whatever state, acts as an "electrical insulator". Thus, sub-cells on the common MCMEA sheet, can effectively operate at widely differing potentials (voltages).

One aspect of the inventive concepts is the application of a polymer membrane material which can co-exist in two distinctly different yet beneficial states. Furthermore, the fabrication of specific features onto the polymer including porous electrodes, embedded vias, interconnects, and/or chemical state conversion of specific regions is/are collectively novel aspects.

In one implementation, the starting polymer material is perfluorosulfonyl fluoride polymer by DuPont. It is available in resin form, known as the "SO2F" or sulfonyl form of Nafion®. This material is a thermoplastic with properties well suited for hot melt extrusion processing. Fabrication of a MCMEA is envisioned with the following generalized process techniques.

Figure 7:
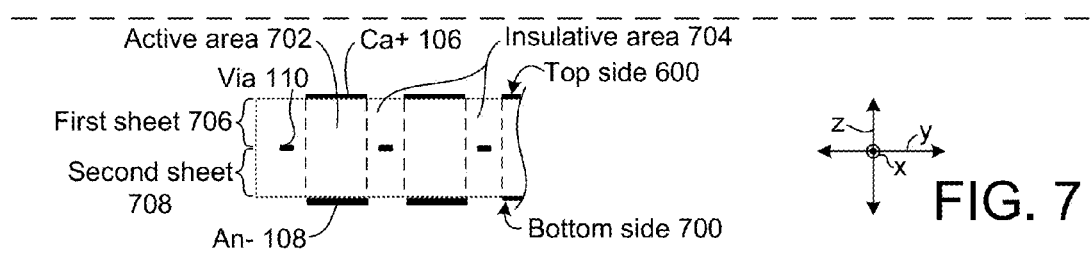
FIGS. 7-10 show sectional views of MCMEA examples in accordance with some implementations.
Figure 8:
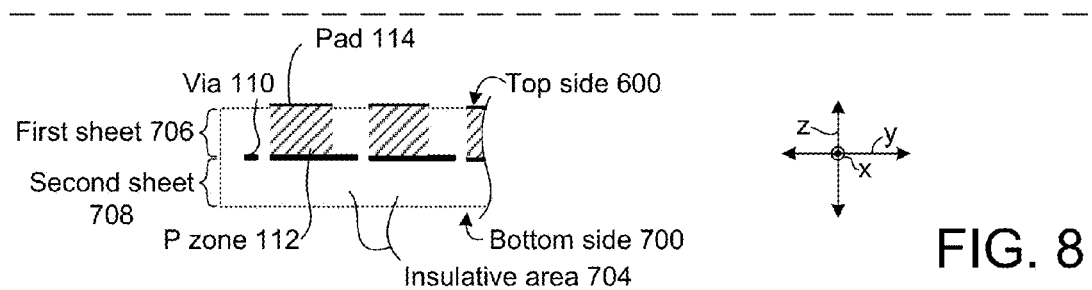
Figure 9:
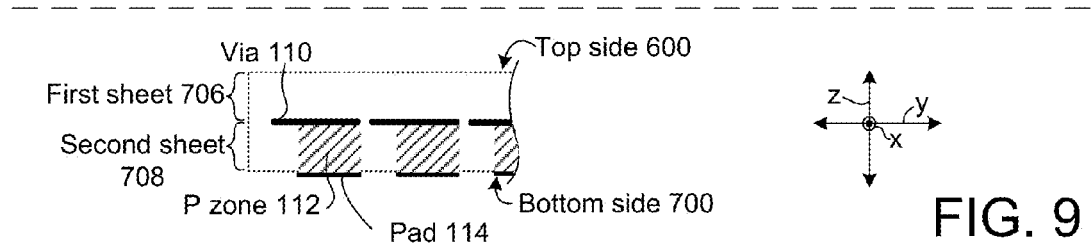

FIGS. 6-9 collectively show another MCMEA implementation. FIG. 6 shows two rows of a nine-by-nine sub-cell MCMEA. FIG. 6 is an elevational view of a top side 600 of the polymer substrate 102 similar to FIGS. 1-5. Looking at FIG. 6-9 collectively, this MCMEA 100(A) includes horizontal rows that include nine sub-cells 104. Further, to avoid clutter on the drawing page, the MCMEA is cut off in the drawing so that only two rows of sub-cells are shown. FIGS. 7-9 shows sectional views through portions of the MCMEA of FIG. 6 as indicated in FIG. 6.

FIG. 7 shows a view through ionically conductive active areas (e.g., active area) 702 of individual sub-cells 104 of the MCMEA 100(A). The top side 600 and opposite bottom side 700 are visible and designated in FIG. 7. The ionically conductive active areas 702 allow protons to travel therethrough, but block electron flow. Ionically conductive active areas 702 are bounded by electrically and ionically insulative areas (e.g., insulative areas) 704. Vias 110 are utilized as an electrically conductive pathway (or a portion thereof) that connects an anode side of one sub-cell to the cathode side of another (adjacent) sub-cell. As used herein, the term "via" means a conducting pathway between two or more substrates (layers). An electrically conductive zone can pass through a portion of the substrate to connect an individual via 110 to an individual topside connection pad 114 (FIG. 8). The connection pad 114 can be thought of as an intersection of the electrode (e.g., cathode or anode) (or an overspray portion thereof) and the underlying conductive zone (e.g., active area 702). FIG. 9 is similar to FIG. 8 except that the active area 702 and connection pad 114 are formed in the second sheet 708 rather than in the first sheet as shown in FIG. 8.

Figure 10:
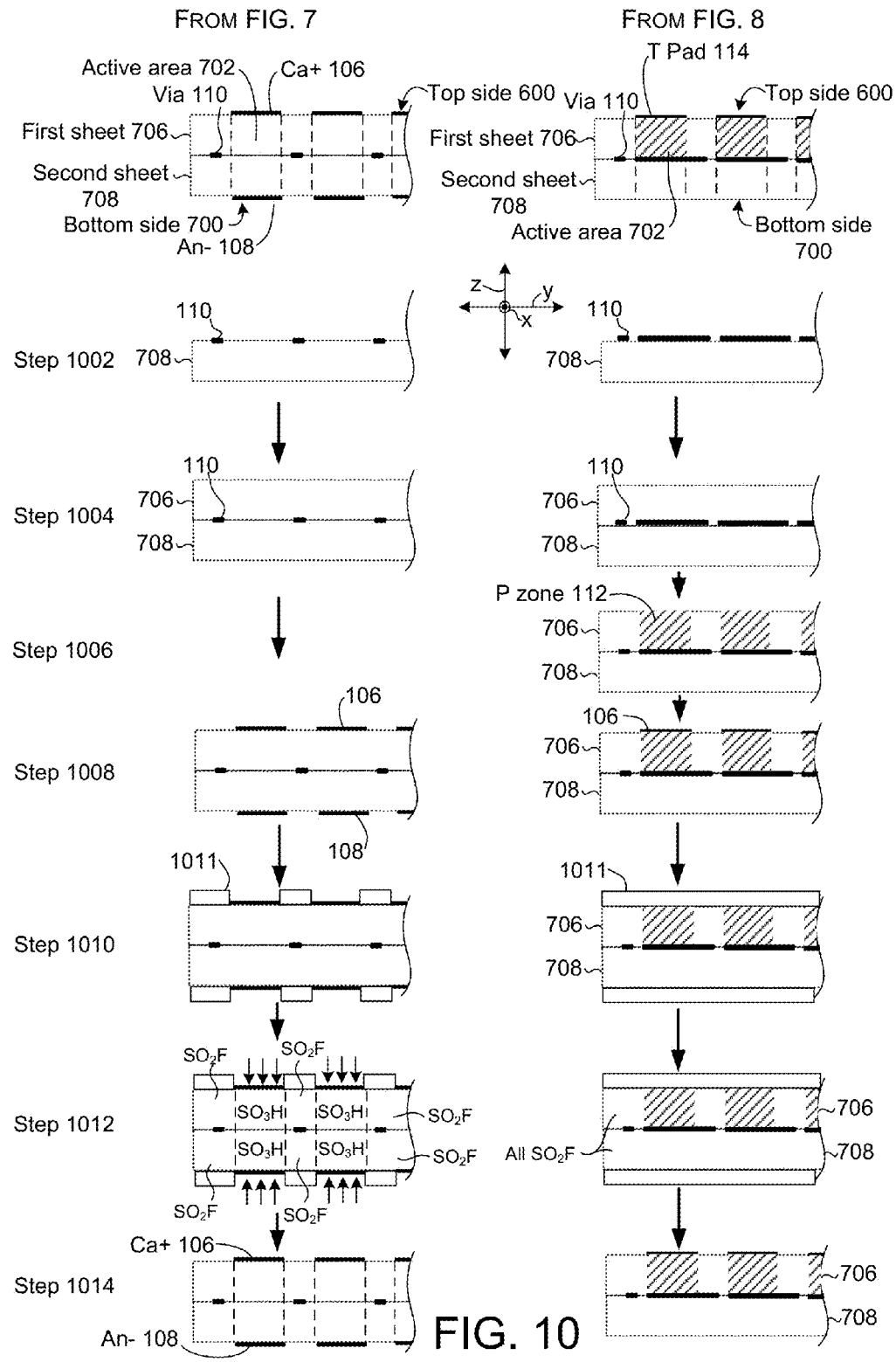

FIG. 10 shows an example technique or process for forming the MCMEA of FIGS. 6-9. Specifically, FIG. 10 show process steps relative to the MCMEA portions shown in FIGS. 7-8. In this implementation, MCMEA 100(A) can be formed from first and second polymer sheets 706 and 708.

Step 1002 can form vias 110 on polymer sheet 708 (e.g., the bottom sheet). The vias 110 can be formed in various ways, such as from a stencil, printing, decal, etc.

Step 1004 shows another polymer sheet 706 (e.g., the top sheet) fused to polymer sheet 708 with the vias 110 sandwiched in-between. This can be termed a fused sheet. Various fusing techniques can be used, some of which are described above.

Step 1006 can form the electrically conductive zone (e.g., perforation zone 112) in top sheet 706 (e.g., in the z-direction). This electrically conductive zone can be formed in various ways. For instance, perforations can be made into the first sheet, such as with a laser or mechanically with a spiked die. The perforations can then be filled with a conductive slurry, such as a carbon slurry. Alternatively, the via could have vertical members (in the z-direction), (e.g., microspikes) that perforate the upper sheet when the sheets are fused together. For instance, the vias (and microspikes) could be printed with a 3-D printer out of a metal or other conductor. (While not shown, similar or the same techniques can be applied to form electrically conductive zones in the lower sheet of FIG. 8).

Step 1008 can form electrodes (e.g., cathodes 106 and anodes 108) on the top and bottom surfaces, respectively of the fused sheet. Various techniques can be used to form the electrodes, some of which are discussed above along with examples of electrode composition. In cases where the electrode includes a conductor, such as carbon fiber, catalyst, and $SO_3H$, a conductor, such as carbon fiber may form the connection pad 114 and may abut the electrode.

Step 1010 can mask areas 1011 of the fused sheet around the electrodes (e.g., mask areas that are not intended to become active areas).

Step 1012 can expose the unmasked areas to conditions to convert the sheet material to an ionically conductive form. In this example, exposed sheet material is converted from an $SO_2F$ configuration to an $SO_3H$ configuration using a technique described above. Of course, other polymer configurations are contemplated that can be selectively converted from ionically insulative to ionically conductive.

Step 1014 can remove the seal or mask (1011 of step 1010) to expose the cathodes 106 and anodes 108. This step can also involve adding a macro GDL layer to the overall MCMEA. Of course, other techniques can be used and/or the order of the steps can be changed. For instance, the electrodes could be added after portions of the polymer sheet are converted to the ionically conductive form.

Note that the MCMEA 100(A) could also be fabricated in other ways, such as by fused deposition accomplished by a 3-D printer.

While specific MCMEA configurations are described in detail, still other various configurations are contemplated that can employ the fundamental MCMEA concepts. Among other potentially beneficial features are high voltage, low current characteristics attained on a single polymer electrochemical component containing multiple sub-cells (MEAs) electrically interconnected in series employing embedded vias.

Among other aspects, the inventive concepts, in all possible geometric configurations, can teach the novel simultaneous application of perfluorosulfonyl fluoride polymer in two chemically convertible states.

An additional feature of the MCMEA can relate to voltage sensing. Sensing of internal sub-cell or sub-cell group voltages is a feature which can be incorporated into the MCMEA with addition of conductive traces extended to the edge connector regions (e.g., connection pads 114).

Another additional feature of the MCMEA can relate to Inline shunting. Inline shunting can be useful for sub-cell conditioning. Inline shunting can be facilitated for individual or sub-cell groups with the addition of conductive traces extended to the edge connector regions (e.g., connection pads 114). All internal traces which will carry shunt current are designed for the proper ampacity. Field effect transistors (FETs) and shunting control circuitry may or may not be external to the MCMEA depending upon design.

A simple arrangement for sub-cell group shunting can be envisioned on the MCMEA 100 shown on FIGS. 1-5. Each row contains 10 sub-cells. Conductive traces can be extended outwardly from the ends of each row to an external edge connection. As such, cells in each row designation K-A, L-B, M-C, N-D, etc. (specifically labeled in FIG. 4) can be shunted externally, while the MCMEA is under operational load. As an option, frame caps (not shown) can be designed with special features to facilitate more sophisticated shunting patterns.

In summary, the present concepts can involve multiple pairs of electrodes configured on a polymer substrate to form an integrated interconnected membrane electrode assembly (e.g., MCMEA). Some implementations of the fabrication process involve two polymer substrate sheets and a PTFE (polytetrafluoroethylene) center micro-mesh fused into a continuous composite sheet which embeds electrical crossover strip vias. (See for example, FIGS. 5-9.) This configuration provides designated cell surface areas which can receive catalyzed porous electrodes and ultimately be hydrolyzed to impart electrolyte ionic exchange properties. The multi cell interconnection pattern within the sheet assembly can provide for one contiguous series electrical connection through all sub-cells. The completed composite sheet assembly can provide one positive (+) electrical output and one negative (−) electrical output.

Viewed from one perspective, the characteristic low voltage-high current relationship of individual prior art fuel cells poses numerous design challenges for system developers who usually employ stack configurations with inherent series physical and electrical connections to raise the voltage to manageable levels for downstream power conditioning subsystems. Nonetheless, throughout the entire (prior art) stack high currents are conveyed from cell to adjacent cell and through all inline components including gas diffusion layers, current collecting plates, heat sinks etc. Not only does the designer attempt to minimize electrical $I^2R$ (current squared times resistance) losses through components and across interfaces, at least in some configurations the designer must carefully design fuel manifolds, cell channels, cooling flow components, and force application members to maintain crucial operational balances among all cells. Any thermal, electrical, or fuel flow imbalance in a stack can lead to damage of one or more cells. Since a stack is no more reliable than its weakest cell, one cell driven to failure could compromise the entire power system.

In contrast, some of the present implementations can provide a comparatively high voltage (low current) MCMEA structure. This MCMEA structure can be fabricated as a composite sheet assembly from polymer roll stock, among other techniques. This configuration offers a novel core building block for solid polymer fuel cell system developers allowing enhanced design flexibility, reduced balance of plant complexity, broader capacity scaling potential, higher operating efficiency, increased cost effectiveness, ease of system maintenance, and/or higher system reliability.

In contrast, prior art MEAs are fabricated as single cell constructs each having one homogeneous active area per electrode. The present concepts offer a subdivision of such active area into "N" subdivided areas leading to "N" cells within the approximately same MEA aperture. Since electrical current is directly "proportional" to cell active area, "N" subdivided cells will each produce a "reduced" current in proportion to their smaller active area. Furthermore, the present concepts offer a contiguous series electrical interconnection of "N" subdivided cells to produce a total additive output voltage of "N" times the voltage of any single subdivided cell. This total voltage is also "N" times greater than the voltage of the prior art MEAs.

From the foregoing description, it should be apparent that the prior art single cell, and the newly invented MCMEAs can both have the same total active area, and are each capable of providing the same (or similar) electrical power output. However, the prior art cell does so at a relatively low voltage and a comparatively high current, while the present MCMEA does so preferentially at a comparatively high voltage and a low current. Furthermore, electrical outputs of the prior art cell are collected from facial contact with the entire active surface area, while the present implementations can provide an MCMEA that simply presents its electrical outputs at the edge as a feed-through within the assembly gas seal.

The present implementations can offer the ability to provide comparatively high voltage and low current through active area segmentation and series interconnection at the core MCMEA level. This configuration offers numerous significant benefits. In addition, specific novel manufacturing processing techniques and associated material states are also described.

High voltage low current MCMEAs configured for operation within individual gas frames (or modules) can provide several potential advantages. For instance, MCMEA electrical outputs can be located on the edge of the sheet assembly rather than on the facial surfaces. Therefore interfacial gas diffusion layers and heat sinks do not have to conduct electrical current. Gas diffusion layer (GDL) material can now be selected from low cost, non-conductive, porous materials easily functionalized for better water management through desired levels of hydrophilicity and/or hydrophobicity. Prior art surface current collectors can be eliminated. Frame features for force application to reduce interfacial resistance can also be eliminated.

Another potential advantage is that multiple MCMEAs, by design, add power capacity through parallel electrical connections to the fuel cell power bus. Consequently, a weak or failed MCMEA need not bring a system down and it can be easily replaced without interrupting operation. In addition, a weak MCMEA cannot be driven to failure by other MCMEAs in the system. In this parallel scheme, each MCMEA contributes power to its ability and is not forced to pass more current than it can source.

Further, the MCMEA output voltage range is designed for a (potentially) optimum match to the downstream power conditioning subsystem whether it comprises a DC converter or an AC inverter. Matched conditions for high voltage (low current) interface can reduce and potentially minimize electrical losses ($I^2R$), can simplify power conditioning design, and can reduce parts count. For instance, a nine by nine array of sub-cells (e.g., 81 sub-cells) can produce an output of about 50-55 volts at maximum power. This output can provide advantages to a power conditioning sub-system of a fuel cell system that operates in conjunction with a 48 volt battery bank.

Some of the present MCMEAs can provide inherent immunity to damage from fuel starvation, as all cells within each MCMEA are contained within the same sealed fuel compartment. Since all cells within the MCMEA envelope see the same dynamic fuel conditions, they cannot get out of balance with respect to one another. Consequently, cells within the MCMEA are inherently protected, providing a major contribution to overall system reliability. (Historically, in prior art stack configurations, electrical imbalance from fuel starvation or from dynamic manifold flow and pressure variations is a primary cause of cell cumulative damage through intermittent cell voltage reversals.)

Another potential advantage is that sub-cells within each MCMEA are protected against thermal imbalance as they (e.g., the sub-cells) can share one common heat sink within the frame.

Further, the composite polymer sheet of the MCMEA can be detailed with areas having two distinct sets of properties. In areas sandwiched between two electrodes the polymer can be hydrolyzed to become an ionic conductor. (For example see FIGS. 6-10.) In surrounding areas and in those which form the MCMEA sheet perimeter the polymer has properties of a thermoplastic which can easily be sonic welded (to the frame) to provide a reliable gas seal and additional localized mechanical integrity around each cell. Thermoplastic (non-ion-conducting) regions between sub-cells will prevent any cross ion flow between sub-cells. Overall, the sheet polymer, whether a thermoplastic or an ion conductor, is everywhere an insulator to electronic flow. Therefore, no issue will arise from sub-cells on the same sheet having widely varying potentials (voltages) from a central reference.

The inventive concepts can also include additional printed electrical traces on the MCMEA sheet (using conductive inks such as graphene from Vorbeck, or metallic compounds) to present internal cell voltage sense signals and temperature sense signals, shunt paths, etc. to the edge interface. Further, components, such as discrete electronic components, can also be embedded in the MCMEA. For instance, various microelectronic components, such as FETs, diodes, sensors, resistors, and/or chips, could be included in the MCMEA to achieve specific local functionalities, such as shunting and/or temperature sensing.

In theory, this MCMEA concept can be applied to any solid polymer MEA, including low temperature PEM fuel cells, high temperature PBI/phosphoric acid cells, and/or alkaline polymer membrane cells. However, this description offers a greater level of detail to low temperature PEM fuel cells using Nafion® PFSA polymer electrolyte.

Example System Configuration

Figure 11:
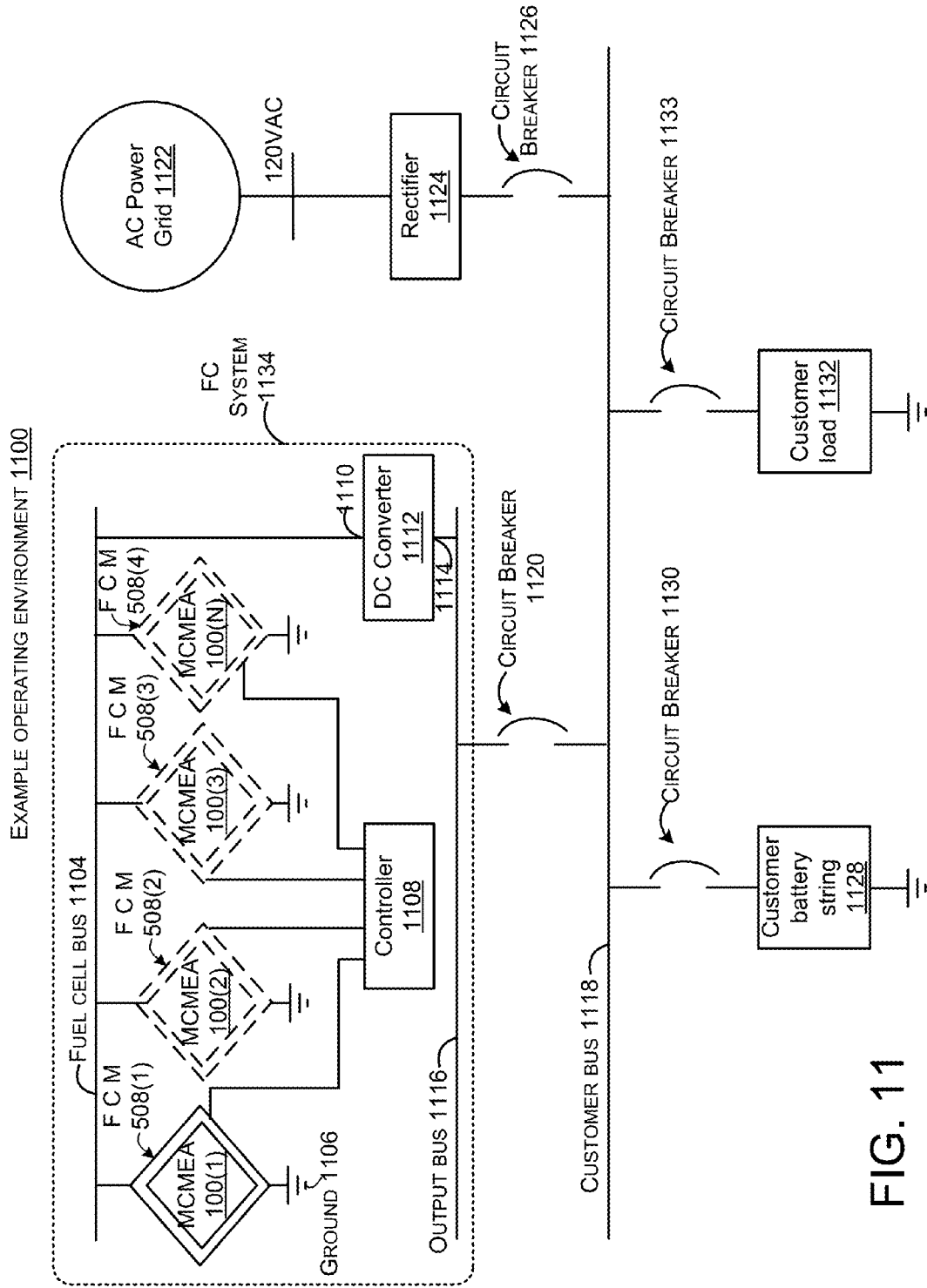
FIG. 11 shows an example fuel cell system that is configured to employ MCMEA implementations in accordance with some implementations of the present concepts.

FIG. 11 shows an example fuel cell operating environment 1100 in which one or more MCMEAs 100 (e.g., as complete fuel cell modules) can be employed. In this implementation, the MCMEAs 100 are employed as part of respective fuel cell modules 508. In this case, four MCMEAs 100(1), 100(2), 100(3), and 100(N) are employed (2-N being optional and N representing that any number of MCMEAs can be employed).

Each of the MCMEAs 100, via their respective fuel cell modules 508, can be connected to a fuel cell bus 1104 and to ground 1106 (not every instance of ground 1106 is labeled to avoid clutter on the drawing page). Similarly, the fuel cell modules 508 can be electrically coupled to the fuel cell bus 1104 in a parallel manner. The MCMEAs fuel cell modules 508 can also be coupled to a controller 1108 via multiple switches. The controller 1108 can contain a microprocessor or other processing device that is configured or configurable to control functionality related to the fuel cell modules 508.

The fuel cell bus 1104 can be connected to an input side 1110 of a DC power converter or "DC converter" 1112. An output side 1114 of the DC converter 1112 can be connected to an output bus 1116. The output bus 1116 can be switchably connected to a customer bus 1118 via a breaker 1120. The AC power grid 1122 can be connected to a rectifier 1124 that can then be switchably connected to the customer bus 1118 via another breaker 1126. A customer battery string 1128 can be switchably connected to the customer bus 1118 via another breaker 1130. Finally, a customer load 1132 can be switchably connected to the customer bus 1118 via another breaker 1133.

The MCMEAs 100, fuel cell modules 508, controller 1108, and DC converter 1112 can be thought of as a fuel cell system 1134. The fuel cell system 1134 can include alternative or additional components to those shown here. For instance, the fuel cell system can include fuel supply elements that can be controlled by controller 1108, but are not illustrated relative to FIG. 11. Note that while the illustrated fuel cell system employs a DC converter, given the high voltage output of the MCMEAs, an alternative fuel cell system could employ an AC inverter for efficient AC applications.

In operation, if power is lost on the AC power grid 1122, the customer battery string 1128 and/or the fuel cell modules 508 can supply power for the customer load 1132. Thus, the DC converter 1112 can supply power from the fuel cell modules 508 to the output bus 1116. As noted above, the number of cells on the MCMEAs 100 of the fuel cell modules 508 can be selected to match the customer battery string 1128. For instance, a nine by nine array of sub-cells (e.g., 81 sub-cells) per MCMEA 100 can produce an output of about 50-55 volts at maximum power. This output can provide advantages to a power conditioning sub-system of the fuel cell system that operates in conjunction with a 48 volt customer battery string.

CONCLUSION

Although techniques, methods, devices, systems, etc. pertaining to fuel cells are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A membrane electrode assembly, comprising:
a polymer membrane substrate that includes multiple active areas that comprise acid forms of the polymer membrane substrate interspersed between electrically insulative areas that comprise sulfonyl forms of the polymer membrane substrate; and,
multiple electrode pairs formed on the polymer membrane substrate over the multiple active areas with anode electrodes positioned on a first side of the polymer membrane substrate and cathode electrodes positioned on a second opposite side of the polymer membrane substrate, wherein individual anodes are electrically connected to individual adjacent and opposite cathodes through the electrically insulative areas.

2. The membrane electrode assembly of claim 1, wherein the polymer membrane substrate comprises multiple fused polymer membrane sheet substrates.

3. The membrane electrode assembly of claim 1, wherein the polymer membrane substrate comprises a single polymer membrane substrate sheet.

4. The membrane electrode assembly of claim 1, wherein the multiple electrode pairs are identical size and shape to one another.

5. The membrane electrode assembly of claim 1, further comprising a first non-conductive gas diffusion layer positioned against the first side of the polymer membrane substrate and a second non-conductive gas diffusion layer positioned against the second opposite side of the polymer membrane substrate.

6. The membrane electrode assembly of claim 1, wherein the polymer membrane substrate is planar.

7. The membrane electrode assembly of claim 1, wherein the multiple active areas of the polymer membrane substrate are ionically conductive and electrically insulative and the electrically insulative areas of the polymer membrane substrate are ionically insulative and electrically insulative.

8. The membrane electrode assembly of claim 1, embodied on a fuel cell system.

9. The membrane electrode assembly of claim 1, wherein the multiple active areas comprise sulfonic acid ($SO_3H^+$) and the electrically insulative areas comprise sulfonyl ($SO_2F$).

10. The membrane electrode assembly of claim 1, wherein the acid forms of the multiple active areas of polymer membrane substrate comprises sulfonic acid ($SO_3H^+$) and the sulfonyl forms of the electrically insulative areas of the polymer membrane substrate comprise sulfonyl ($SO_2F$).

11. A membrane electrode assembly, comprising:
a polymer membrane substrate that comprises a first side and an opposite second side, and the polymer membrane substrate includes multiple ionically conductive active areas that extend between the first side and the opposite second side and are isolated from one another by electrically and ionically insulative areas that extend between the first side and the opposite second side;
multiple electrode pairs formed on the polymer membrane substrate over the multiple ionically conductive active areas with anode electrodes positioned on the first side of the polymer membrane substrate and cathode electrodes positioned on the second opposite side of the polymer membrane substrate; and,
conductors extending through the electrically and ionically insulative areas from individual anodes to individual adjacent and opposite cathodes.

12. The membrane electrode assembly of claim 11, wherein the multiple ionically conductive active areas comprise sulfonic acid ($SO_3H^+$) and the electrically and ionically insulative areas comprise sulfonyl ($SO_2F$).

13. The membrane electrode assembly of claim 11, wherein the polymer membrane substrate comprises first and second sandwiched sheets having parallel planar surfaces, wherein the first side is defined by an individual planar surface of the first sheet and the second opposite side is defined by another individual planar surface of the second sheet.

14. The membrane electrode assembly of claim 13, wherein the conductors comprise a portion that runs parallel to the planar surfaces and between the first and second sandwiched sheets.

15. The membrane electrode assembly of claim 14, wherein the ionically conductive active areas extend between the planar surfaces of the first and second sandwiched sheets and the electrically and ionically insulative areas extend between the planar surfaces of the first and second sandwiched sheets and surround the ionically conductive active areas between the planar surfaces.

* * * * *